United States Patent
Park et al.

(10) Patent No.: US 9,455,433 B2
(45) Date of Patent: Sep. 27, 2016

(54) ELECTRODE ASSEMBLY

(71) Applicant: LG Chem, Ltd., Seoul (KR)

(72) Inventors: Ji-Hye Park, Daejeon (KR); Song-Taek Oh, Daejeon (KR); Su-Rim Lee, Daejeon (KR); Jung-Seok Choi, Daejeon (KR); Hyeok-Moo Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/438,946

(22) PCT Filed: Oct. 31, 2014

(86) PCT No.: PCT/KR2014/010342
§ 371 (c)(1),
(2) Date: Apr. 28, 2015

(87) PCT Pub. No.: WO2015/065086
PCT Pub. Date: May 7, 2015

(65) Prior Publication Data
US 2016/0028065 A1    Jan. 28, 2016

(30) Foreign Application Priority Data

Oct. 31, 2013  (KR) .......................... 10-2013-0131567
Oct. 28, 2014  (KR) .......................... 10-2014-0147676

(51) Int. Cl.
*H01M 10/04*    (2006.01)
*H01M 10/12*    (2006.01)
(Continued)

(52) U.S. Cl.
CPC ........... *H01M 2/1686* (2013.01); *H01M 2/166* (2013.01); *H01M 2/1646* (2013.01); *H01M 10/045* (2013.01); *H01M 10/0459* (2013.01);
(Continued)

(58) Field of Classification Search
USPC ............... 429/129–147, 247–255, 149–160, 429/163–187; 29/623.1–623.5
See application file for complete search history.

(56) References Cited

U.S. PATENT DOCUMENTS

2002/0160257 A1   10/2002  Lee et al.
2002/0160258 A1   10/2002  Lee et al.
(Continued)

FOREIGN PATENT DOCUMENTS

EP         2234194 A1     9/2010
KR    2001-0082058 A     8/2001
(Continued)

OTHER PUBLICATIONS

International Search Report for Application No. PCT/KR2014/010342 dated Oct. 31, 2014.
(Continued)

*Primary Examiner* — Basia Ridley
*Assistant Examiner* — Caitlin Wilmot
(74) *Attorney, Agent, or Firm* — Lerner, David, Littenberg, Krumholz & Mentlik, LLP

(57) ABSTRACT

The present disclosure provides an electrode assembly comprising a plurality of unit cells, each unit cell having a full-cell or a bi-cell structure comprising a cathode, an anode, and a first separator interposed between the cathode and the anode, and the plurality of unit cells being stacked by surrounding each unit cell with a second separator, wherein the second separator has an average pore diameter ($d_2$) larger than the average pore diameter ($d_1$) of the first separator in the unit cells.

8 Claims, 3 Drawing Sheets

(51) Int. Cl.
*H01M 10/14* (2006.01)
*H01M 2/16* (2006.01)
*H01M 10/0525* (2010.01)
*H01M 10/0585* (2010.01)

(52) U.S. Cl.
CPC ..... *H01M 10/0525* (2013.01); *H01M 10/0585* (2013.01); *H01M 2220/30* (2013.01); *Y02E 60/122* (2013.01)

(56) References Cited

U.S. PATENT DOCUMENTS

| | | |
|---|---|---|
| 2003/0013012 A1 | 1/2003 | Ahn et al. |
| 2007/0184350 A1 | 8/2007 | Kim et al. |
| 2009/0148759 A1* | 6/2009 | Mitsuda ............... H01G 9/058 429/142 |
| 2010/0159314 A1 | 6/2010 | Kim et al. |
| 2010/0261047 A1 | 10/2010 | Kim et al. |
| 2011/0052952 A1 | 3/2011 | Roh et al. |
| 2011/0256438 A1 | 10/2011 | Taguchi et al. |
| 2013/0011715 A1 | 1/2013 | Lee et al. |

FOREIGN PATENT DOCUMENTS

| | | |
|---|---|---|
| KR | 2001-0082059 A | 8/2001 |
| KR | 20010082060 A | 8/2001 |
| KR | 20080095770 A | 10/2008 |
| KR | 100933427 B1 | 12/2009 |
| KR | 20110124748 A | 11/2011 |
| KR | 101147207 B1 | 5/2012 |
| KR | 20130006256 A | 1/2013 |
| WO | 2013095038 A1 | 6/2013 |

OTHER PUBLICATIONS

Search Report from European Application No. 14857105.2, dated Jun. 28, 2016.

* cited by examiner

ELECTRODE ASSEMBLY

CROSS-REFERENCE TO RELATED APPLICATIONS

The present application is a national phase entry under 35 U.S.C. §371 of International Application No. PCT/KR2014/010342 filed Oct. 31, 2014, published in Korean, which claims priority from Korean Application No. 10-2013-0131567 filed Oct. 31, 2013 and Korean Application No. 10-2014-0147676 filed Oct. 28, 2014, all of which are hereby incorporated herein by reference.

TECHNICAL FIELD

The present disclosure relates to an electrode assembly, more specifically to an electrode assembly providing improved wetting and degassing properties to an electrochemical device.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Particularly, according to the recent trend that electronics become downsized and lightweight, the rechargeable secondary batteries also need a smaller size and a light weight, as well as high capacity.

Also, the secondary batteries are classified according to the structure of an electrode assembly consisting of cathode/separator/anode, for example, into a jelly-roll (winding type) structure obtained by interposing a separator between a cathode and an anode which are in the form of a long sheet, followed by winding, or a stack (laminating type) structure obtained by interposing separators between multiple cathodes and anodes having a predetermined size, followed by sequentially laminating.

However, such a conventional electrode assembly has several problems.

First, since the jelly-roll type electrode assembly is prepared in by winding a cathode and an anode being a sheet form in the contact state thereof to form a cylindrical or oval cross-section, the electrode assembly is internally accumulated with stress caused by the expansion and contraction of electrodes during charging and discharging processes. When such a stress accumulation exceeds a certain limit, the electrode assembly is apt to be deformed. By the deformation of the electrode assembly, the space between the electrodes become un-uniform to deteriorate battery performances rapidly, and an internal short circuit is generated to threaten battery safety. Also, the winding of the cathode and the anode being a sheet form is difficult to maintain the uniform distance between the cathode and the anode, and the rapid winding thereof is also difficult, and thus it is unfavorable in terms of productivity.

Second, since the stack type electrode assembly is prepared by laminating multiple cathode and anode units sequentially, it needs a separate procedure of transferring a plate for producing the units, and the sequential laminating requires much time and efforts, and thus its productivity is low.

In order to overcome these problems, the present applicant has developed a distinctive-structured electrode assemblies being a mixed form of the jelly-roll type and the stack type, i.e., stack-folded electrode assemblies prepared by winding bi-cells or full-cells with a long separator sheet continuously, the bi-cells or full-cells being obtained by laminating cathode units and anode units between which separators are interposed. Such stack-folded electrode assemblies are disclosed in Korean Patent Application Publication NOS. 2001-0082058, 2001-0082059 and 2001-0082060.

FIGS. 1 to 3 are cross-sectional views schematically showing the structure of stack-folded electrode assemblies, in which the same numeral refers to the same part.

Referring to FIGS. 1 to 3, electrode assemblies 10, 20, 30 comprises a plurality of unit cells $7a$, $7b$, $7c_1$, $7c_2$, each unit cell having a first separator $3a$, $3b$, $3c$, and an anode $1a$, $1b$, $1c$ and a cathode $5a$, $5b$, $5c$ disposed on both sides of the first separator $3a$, $3b$, $3c$. The cathode $5a$, $5b$, $5c$ has a structure that a cathode active material layer is formed on both surfaces of a cathode current collector, and the anode $1a$, $1b$, $1c$ has a structure that an anode active material layer is formed on both surfaces of an anode current collector. As shown in FIGS. 1 to 3, each unit cell has various structures, including a full-cell ($7a$, $7b$) structure in which one cathode $5a$, $5b$ and one anode $1a$, $1b$ are disposed on both sides of the first separator $3a$, $3b$; and a bi-cell ($7c_1$, $7c_2$) structure in which each first separator $3c$ is disposed on both surfaces of the cathode $5c$ or the anode $1c$, and another cathode $5c$ or another anode $1c$ are each disposed on each first separator $3c$, for example, a structure of cathode/separator/anode/separator/cathode or anode/separator/cathode/separator/anode.

In the electrode assemblies 10, 20, 30, each unit cell $7a$, $7b$, $7c_1$, $7c_2$ exists in the laminated form. Each of the unit cells $7a$, $7b$, $7c_1$, $7c_2$ which are neighboring and facing with each other is continuously surrounded with a second separator $9a$, $9b$, $9c$ alone, the separator $9a$, $9b$, $9c$ being disposed between the unit cells in various forms as shown in FIGS. 1 to 3, thereby performing the function as a separator.

Such a stack-folded electrode assembly is put into a battery case, to which an electrolyte solution is introduced, thereby preparing a battery. After the electrolyte solution is introduced, it takes time for the electrolyte solution to be sufficiently impregnated to the separator. Actually, it is difficult to obtain sufficient impregnation time owing to the problem of productivity. Accordingly, the electrolyte solution is not sufficiently impregnated to the separator, so the separator may less wet and the electrolyte solution not being impregnated may be leaked under severe conditions.

Further, gases generated from the decomposition of the electrolyte solution and the side reactions of the battery cause loosening phenomenon in the battery to deteriorate battery performances. If the gases generated from the side reactions fail to be discharged, it is difficult to inhibit the expansion of the battery. From this, the battery is deteriorated in its performances and is apt to be deformed by external impact, so the strength of the battery is lowered. Particularly, these problems are more likely to occur under high temperature conditions.

DISCLOSURE

Technical Problem

The present disclosure is designed to solve the problems of the related art, and therefore the present disclosure is directed to providing an electrode assembly having improved wettability and no leak of an electrolyte solution, and being less deformed by external impact.

Technical Solution

In accordance with one aspect of the present disclosure, there is provided an electrode assembly comprising a plurality of unit cells, each unit cell having a full-cell or a bi-cell structure comprising a cathode, an anode, and a first separator interposed between the cathode and the anode, and the plurality of unit cells being stacked by surrounding each unit cell with a second separator, wherein the second separator has an average pore diameter ($d_2$) larger than the average pore diameter ($d_1$) of the first separator in the unit cells.

The average pore diameter ($d_1$) of the first separator in the unit cells may range from 20 to 50 nm, and the average pore diameter ($d_2$) of the second separator may be 22 nm or more.

The average pore diameter ($d_2$) of the second separator may be 2 to 20 nm larger than the average pore diameter ($d_1$) of the first separator in the unit cells.

Also, the second separator may have a porosity ($p_2$) higher than the porosity ($p_1$) of the first separator in the unit cells.

The porosity ($p_1$) of the first separator in the unit cells may range from 20 to 50%, and the porosity ($p_2$) of the second separator may range from 30 to 60%.

The first separator and the second separator may each independently comprise a) a porous substrate having pores, or b) an assembly of a porous substrate having pores and an organic-inorganic porous coating layer formed from inorganic particles and a binder polymer on at least one surface of the porous substrate.

The porous substrate may be made of at least one selected from the group consisting of polyolefins, polyethylene terephthalates, polybutylene terephthalates, polyacetals, polyamides, polycarbonates, polyimides, polyether ether ketones, polyether sulfones, polyphenylene oxides, polyphenylene sulfides, and polyethylene naphthalates.

In accordance with another aspect of the present invention, there is provided an electrochemical device, comprising the above-mentioned electrode assembly that is put in a battery case.

The electrochemical device may be a lithium secondary battery.

Advantageous Effects

In the electrode assembly according to the present disclosure, the second separator surrounding unit cells has a pore size larger than that of the first separator in the unit cells, to improve wettability, the degassing property of removing gases generated from the side reactions of a battery, thereby allowing no leak of an electrolyte solution and less expansion of the battery, and eventually maintaining good battery performances even under long-term use and being less deformed by external impact. Thus, the electrode assembly of the present disclosure can be used in a battery to provide good strength to the battery, thereby improving battery performances including stability.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

<Explanation of Reference Numerals>

Figure 1:
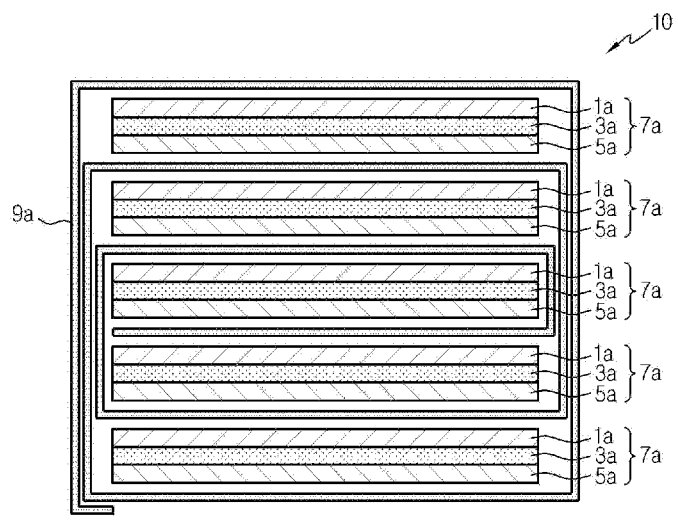
FIG. 1 schematically shows a cross-section of one example of a conventional electrode assembly.

| | |
|---|---|
| 10, 20, 30: Electrode assembly | 3a, 3b, 3c: First separator |
| 1a, 1b, 1c: Anode | 5a, 5b, 5c: Cathode |
| 7a, 7b, 7c$_1$, 7c$_2$: Unit cell | 9a, 9b, 9c: Second separator |
| 101, 201: Cathode | 103, 203: First separator |
| 105, 205: Anode | 109: Second separator |
| 110, 120, 130, 140, 150: Full-cell | |
| 210, 220, 230, 240, 250: Bi-cell | |

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the constitution of the embodiments and drawings presented herein is just a preferable example for the purpose of illustrations only, not intended to limit the scope of the disclosure, so it should be understood that other equivalents and modifications could be made thereto without departing from the spirit and scope of the disclosure.

One aspect of the present disclosure provides an electrode assembly comprising a plurality of unit cells, each unit cell having a full-cell or a bi-cell structure comprising a cathode, an anode, and a first separator interposed between the cathode and the anode, and the plurality of unit cells being stacked by surrounding each unit cell with a second separator, wherein the second separator has an average pore diameter ($d_2$) larger than the average pore diameter ($d_1$) of the first separator in the unit cells.

In the present disclosure, the first separator is present in the unit cells and is interposed between a cathode and an anode in each unit cell, while the second separator functions to surround the unit cells. The electrode assembly is put in a battery case, to which an electrolyte solution is introduced, thereby preparing a battery. In order to ensure the performances and stability of the battery, it is necessary for the separator to wet easily with the electrolyte solution. Also, the decomposition of the electrolyte solution and the side reactions of the battery may generate gases whose insufficient removal may deteriorate battery performances. Therefore, it is necessary to improve the degassing property of removing the generated gases. For this, the present inventors have endeavored to meet these needs and found that the average pore size of the second separator is controlled to be larger than that of the first separator, thereby improving the wettability and the degassing property.

According to a preferred embodiment of the present disclosure, under the condition that the average pore diameter of the second separator is larger than that of the first separator, the average pore diameter ($d_1$) of the first separator in the unit cells may range from 20 to 50 nm, and the average pore diameter ($d_2$) of the second separator may be 22 nm or more. Preferably, the average pore diameter ($d_1$) of the first separator may range from 20 to 23 nm, and the average pore diameter ($d_2$) of the second separator may range from 24 to 28 nm. More preferably, the average pore diameter ($d_1$) of the first separator may range from 20 to 22 nm, and the average pore diameter ($d_2$) of the second separator may range from 23 to 25 nm.

Also, according to another preferred embodiment of the present disclosure, the average pore diameter ($d_2$) of the second separator may be 2 to 20 nm, preferably 2 to 10 nm higher than the average pore diameter ($d_1$) of the first separator in the unit cells.

In the present disclosure, the average pore diameter may be measured with a pore size-measuring instrument according to a conventional method known to a person having ordinary skill in the art.

According to a preferred embodiment of the present disclosure, the second separator may have a porosity ($p_2$) higher than the porosity ($p_1$) of the first separator in the unit cells. That is, in the case that both average pore diameter and porosity of the second separator are larger than those of the first separator, it is more preferred to improve the wettability and the degassing property.

In a preferred embodiment of the present disclosure, the porosity ($p_1$) of the first separator in the unit cells may range from 20 to 50%, and the porosity ($p_2$) of the second separator may range from 30 to 60%. Preferably, the porosity ($p_1$) of the first separator in the unit cells may range from 30 to 50%, and the porosity ($p_2$) of the second separator may range from 35 to 55%. When such a porosity range is satisfied, the desired properties can be effective obtained.

In the present disclosure, the porosity may be measured from the correlation of thickness, weight, and density, according to conventional method known to a person having ordinary skill in the art.

Also, in the present disclosure, the first separator and the second separator may each independently comprise a) a porous substrate having pores, or b) an assembly of a porous substrate having pores and an organic-inorganic porous coating layer formed from inorganic particles and a binder polymer on at least one surface of the porous substrate.

The porous substrate may be made of at least one selected from the group consisting of polyolefins, polyethylene terephthalates, polybutylene terephthalates, polyacetals, polyamides, polycarbonates, polyimides, polyether ether ketones, polyether sulfones, polyphenylene oxides, polyphenylene sulfides, and polyethylene naphthalates. The polyolefins may be a polymer selected from the group consisting of polyethylene, polypropylene, polybutylene, and polypentene.

If necessary, the separators may be a layered structure consisting of the listed polymers such as polypropylene/polyethylene/polypropylene.

In the organic-inorganic porous coating layer, the binder polymer allows the adhesion of inorganic particles so that the inorganic particles can be bound with each other (i.e., the binder polymer connects and immobilizes the inorganic particles therebetween). Also, the organic-inorganic porous coating layer comes in contact with the porous substrate by the binder polymer. In the organic-inorganic porous coating layer, the inorganic particles are substantially present in contact with each other to form a closest packed structure, and an interstitial volume generated from the contact of the inorganic particles with each other becomes a pore of the organic-inorganic porous coating layer. The separator having such an organic-inorganic coating layer has good heat-resistance and thus enhanced stability, but has increased electrical resistance due to the binder polymer.

The inorganic particles are not particularly limited if they are electrochemically stable. That is, the inorganic particles which may be used in the present disclosure are not particularly limited unless an oxidation-reduction reaction occurs in an operating voltage range (for example, 0 to 5 V based on Li/Li$^+$) of an applied electrochemical device. Particularly, inorganic particles having a high dielectric constant can increase the dissociation rate of an electrolyte salt, such as a lithium salt, in a liquid electrolyte, thereby improving an ionic conductivity the electrolyte solution. Also, inorganic particles having a high dielectric constant may be used to increase a dissociation rate of an electrolyte salt, e.g., a lithium salt, in a liquid electrolyte, thereby improving an ionic conductivity of the electrolyte. For these reasons, the inorganic particles are preferably inorganic particles having a dielectric constant of 5 or higher, inorganic particles having the ability to transport lithium ions, or a mixture thereof.

In the present invention, the binder polymer which is used in the organic-inorganic porous coating layer is not particularly limited and include polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyvinyl alcohol, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, and a compound having a low molecular weight of 10.00 g/mol or less.

In the organic-inorganic porous coating layer, the weight ratio of the inorganic particles and the binder polymer preferably ranges from 10:90 to 99:1.

Also, the first separator may have a thickness of 12 to 16 μm, and the second separator may have a thickness of 13 to 17 μm.

Hereinafter, an electrode assembly according to one embodiment of the present disclosure will be more specifically explained for its structure.

A general full-cell has a structure that a layered form of a cathode, an anode, and a first separator is cut into pieces having a regular shape and size, and then laminated, all electrodes being obtained by coating an electrode active material on a current collector. Such a structure is taken as a unit cell for composing a battery by way of lamination, and for this, the electrodes and the first separator should be adhered with each other.

The full cell having such a structure refers to a laminated structure whose both ends have a cathode and an anode, respectively, e.g., cathode/separator/anode or cathode/separator/anode/separator/cathode/separator/anode. On the contrary, a bi-cell refers to a laminated structure whose both ends have the same polar electrode, e.g., a cathode/separator/anode/separator/cathode and anode/separator/cathode/separator/anode.

In the present disclosure, the electrodes are not particularly limited, and may be prepared by coating an electrode active material on a current collector according to a conventional method known in the art. The cathode and the anode active materials used in the electrodes may be those which have been generally used in the cathode and the anode of conventional electrochemical devices. Non-limiting examples of the cathode active material include lithium manganese oxides, lithium cobalt oxides, lithium nickel oxides, lithium iron oxides, and lithium composite oxides thereof. Non-limiting examples of the anode active material include metallic lithium and lithium alloys, soft carbon and hard carbon, natural graphite, Kish graphite, pyrolytic carbon, mesophase pitch based carbon fiber, meso-carbon microbeads, mesophase pitches, petroleum, and coal tar pitch derived cokes.

The electrode active material may be used together with an additive such as a binder and a conductive material according to a conventional method known in the art and added to an organic solvent to obtain an electrode-forming slurry, and the slurry is coated on each electrode current collector. The cathode current collector may be made of aluminum or nickel, and the anode current collector may be made of copper, gold, nickel, or a copper alloy.

Figure 2:
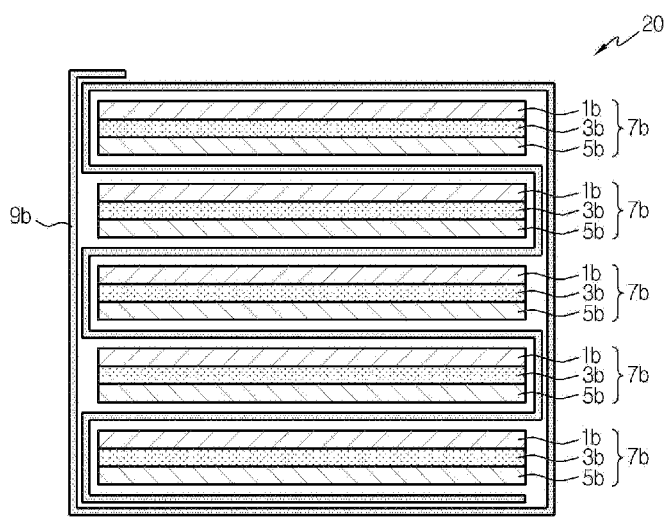
FIG. 2 schematically shows a cross-section of another example of a conventional electrode assembly.
Figure 3:
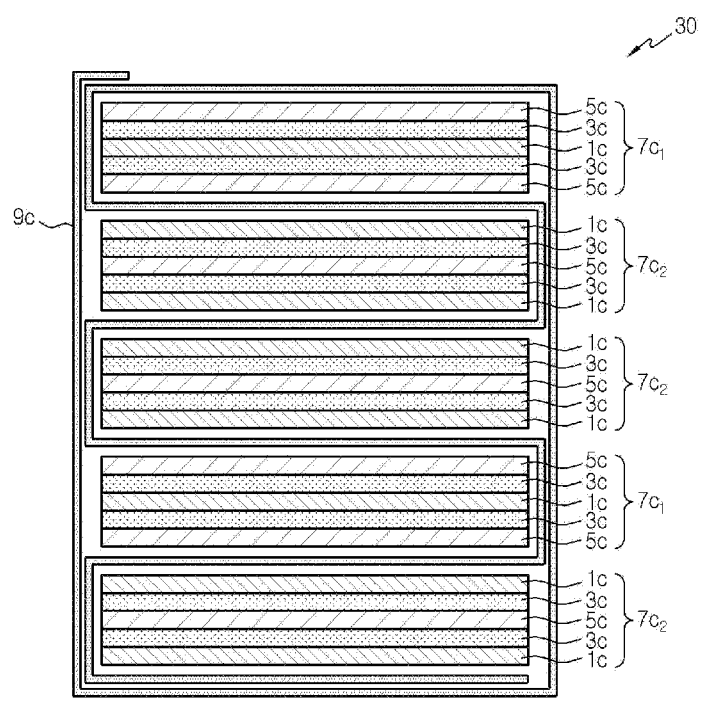
FIG. 3 schematically shows a cross-section of another example of a conventional electrode assembly.

By using the above-mentioned unit cells, an electrode assembly may be prepared by way of stack-folding, as shown in FIGS. 1 to 3. Specifically, the second separator is folded in the direction of surrounding the unit cells or the bi-cells which are faced with each other in a laminated form.

Figure 4:
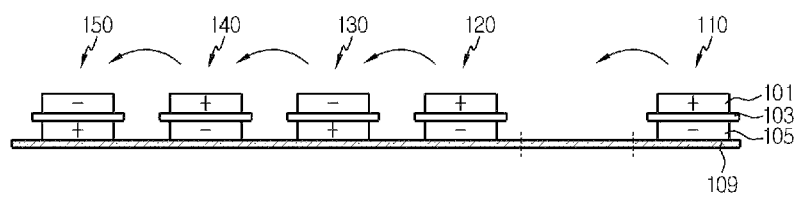
FIG. 4 schematically shows a cross-section of an electrode assembly having unit cells in accordance with one embodiment of the present disclosure.
Figure 5:
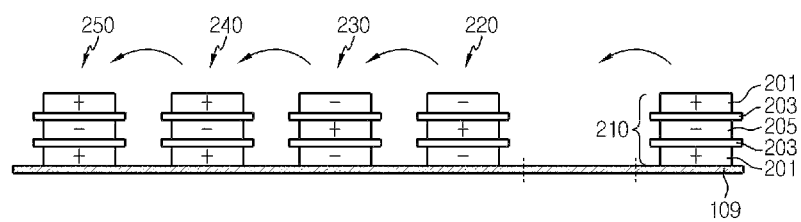
FIG. 5 schematically shows a cross-section of an electrode assembly having unit cells in accordance with another embodiment of the present disclosure.

In FIGS. 4 and 5, arrows indicate the folding direction in the preparation of the electrode assembly shown in FIG. 1, and the folding position is indicated by dot lines. FIG. 4 is for a full-cell and FIG. 5 is for a bi-cell.

As shown in the drawings, when folding from the right end, in order for an electrode 101, 201 disposed in the top of a unit cell 110 or bi-cell 210 to come into contact with a separator 109, 209, there is a region having no unit cell or bi-cell in a space corresponding to about the width of one unit cell 110 or bi-cell 210.

Then, the folding is continuously carried out in the direction of arrows from the position indicated by the dot lines so that all unit cells 110, 120, 130, 140, 150 or all bi-cells 210, 220, 230, 240, 250 are surrounded with the second separator 109, 209. Thereby, the unit cells or the bi-cells are faced with each other in a laminated form (stack-folded). It should be understood to a person having ordinary skill in the art that after the first unit cell 110 or the first bi-cell 210, a space between the next unit cells 120, 130, 140, 150 or the next bi-cells 220, 230, 240, 250 is the same as the height of the laminated cells, and therefore the space would become broad gradually, although the space is indicated to be uniform in FIGS. 4 and 5 for convenience.

The electrolyte solution used in the present disclosure comprises a lithium salt as an electrolyte. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Also, the electrolyte solution used in the present disclosure comprises may be an organic solvent which is conventionally used in an electrolyte solution for a lithium secondary battery. Representative examples of the organic solvent may include propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxy ethane, diethoxy ethane, vinylene carbonate, sulfolane, γ-butyrolactone, propylene sulfide, tetrahydrofuran, and a mixture thereof. In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate is preferably used by mixing with a linear carbonate with low viscosity and low dielectric constant such as dimethyl carbonate and diethyl carbonate in a suitable ratio to provide an electrolyte solution with a high electric conductivity.

Optionally, the electrolyte solution used in the present disclosure may further comprise additives such as an overcharge-preventing agent which is conventionally used in an electrolyte solution in the art.

The battery case used in the present disclosure may be one which is conventionally used in the art, for example, a cylindrical form such as a can, a prismatic form, a pouch form, or a coin form.

The electrode assembly prepared is put in a battery case according to a conventional method and sealed, to prepare an electrochemical device. The electrochemical device is preferably a lithium secondary battery.

The foregoing disclosure has been described through the limited examples and drawings, and is not intended to limit the scope of the present invention. Various changes and modifications within the spirit and scope of the disclosure will become apparent to those skilled in the art from this detailed description.

What is claimed is:

1. An electrode assembly comprising a plurality of unit cells, each unit cell having a full-cell or a bi-cell structure comprising a cathode, an anode, and a first separator interposed between the cathode and the anode, and the plurality of unit cells being stacked by surrounding each unit cell with a second separator,
    wherein the second separator has an average pore diameter ($d_2$) that is 2 to 20 nm larger than the average pore diameter ($d_1$) of the first separator in the unit cells.

2. The electrode assembly of claim 1, wherein the first separator in the unit cells has an average pore diameter ($d_1$) of 20 to 50 nm, and the second separator has an average pore diameter ($d_2$) of 22 nm to 70 nm.

3. The electrode assembly of claim 1, wherein the second separator has a porosity ($p_2$) higher than the porosity ($p_1$) of the first separator in the unit cells.

4. The electrode assembly of claim 3, wherein the first separator in the unit cells has a porosity ($p_1$) of 20 to 50%, and the second separator has a porosity ($p_2$) of 30 to 60%.

5. The electrode assembly of claim 1, wherein the first separator and the second separator each independently comprise:
    a) a porous substrate having pores, or
    b) an assembly of a porous substrate having pores and an organic-inorganic porous coating layer formed from inorganic particles and a binder polymer on at least one surface of the porous substrate.

6. The electrode assembly of claim 5, wherein the porous substrate is made of at least one selected from the group consisting of polyolefins, polyethylene terephthalates, polybutylene terephthalates, polyacetals, polyamides, polycarbonates, polyimides, polyether ether ketones, polyether sulfones, polyphenylene oxides, polyphenylene sulfides, and polyethylene naphthalates.

7. An electrochemical device, comprising:
   the electrode assembly of claim 1; and
   a battery case, wherein the electrode assembly is in the battery case.

8. The electrochemical device of claim 7, which is a lithium secondary battery.

* * * * *